United States Patent [19]

Huyer

[11] Patent Number: 4,877,285

[45] Date of Patent: Oct. 31, 1989

[54] OPEN ROOF CONSTRUCTION FOR A VEHICLE

[75] Inventor: Johannes N. Huyer, Velserbroek, Netherlands

[73] Assignee: Vermeulen-Hollandia Octrooien II B.V., Netherlands

[21] Appl. No.: 202,529

[22] Filed: Jun. 3, 1988

[30] Foreign Application Priority Data

Jun. 25, 1987 [NL] Netherlands .......................... 8701492

[51] Int. Cl.$^4$ .............................................. B60J 7/47
[52] U.S. Cl. .................................... 296/216; 296/220; 296/223; 296/224
[58] Field of Search .......................... 296/216, 220–224

[56] References Cited

U.S. PATENT DOCUMENTS 4,746,165 5/1988 Fuerst et al. .................... 296/220 X

FOREIGN PATENT DOCUMENTS 0182431 5/1986 European Pat. Off. ............. 296/223
12717 1/1984 Japan ................................... 296/216

*Primary Examiner*—Dennis H. Pedder
*Attorney, Agent, or Firm*—Kinney & Lange

[57] ABSTRACT

An open roof construction for a vehicle having an opening (1) in the fixed roof (2), comprises an adjustable panel (3) which, in its closed position, closes the opening (1) in the fixed roof (2) and which, by operating an adjusting mechanism, is capable of being pivoted from its closed position to a backwardly and upwardly inclined position at first and thereupon being moved backwardly into positions above the fixed roof (2), and vice versa. The panel (3) is pivotally supported at its front side by a transverse pivot shaft (26). A tilt out lever (9) is provided at a distance behind said pivot shaft (26) and is pivotally connected to the panel (3) at its upper end. The lower end of the tilt out lever (9) is at least pivotally operatively connected to a slide (7), which is slidably guided in a stationary guide (8) extending in the longitudinal direction of the vehicle and is adapted to be engaged by a drive means such as a cable-like pull-push means (4). According to the invention the slide (7) is a control slide, which not only positively controls the movements of the tilt out lever (9) but also of a height adjusting means (27) carrying said pivot shaft (26) at the front side of the panel (3).

17 Claims, 8 Drawing Sheets

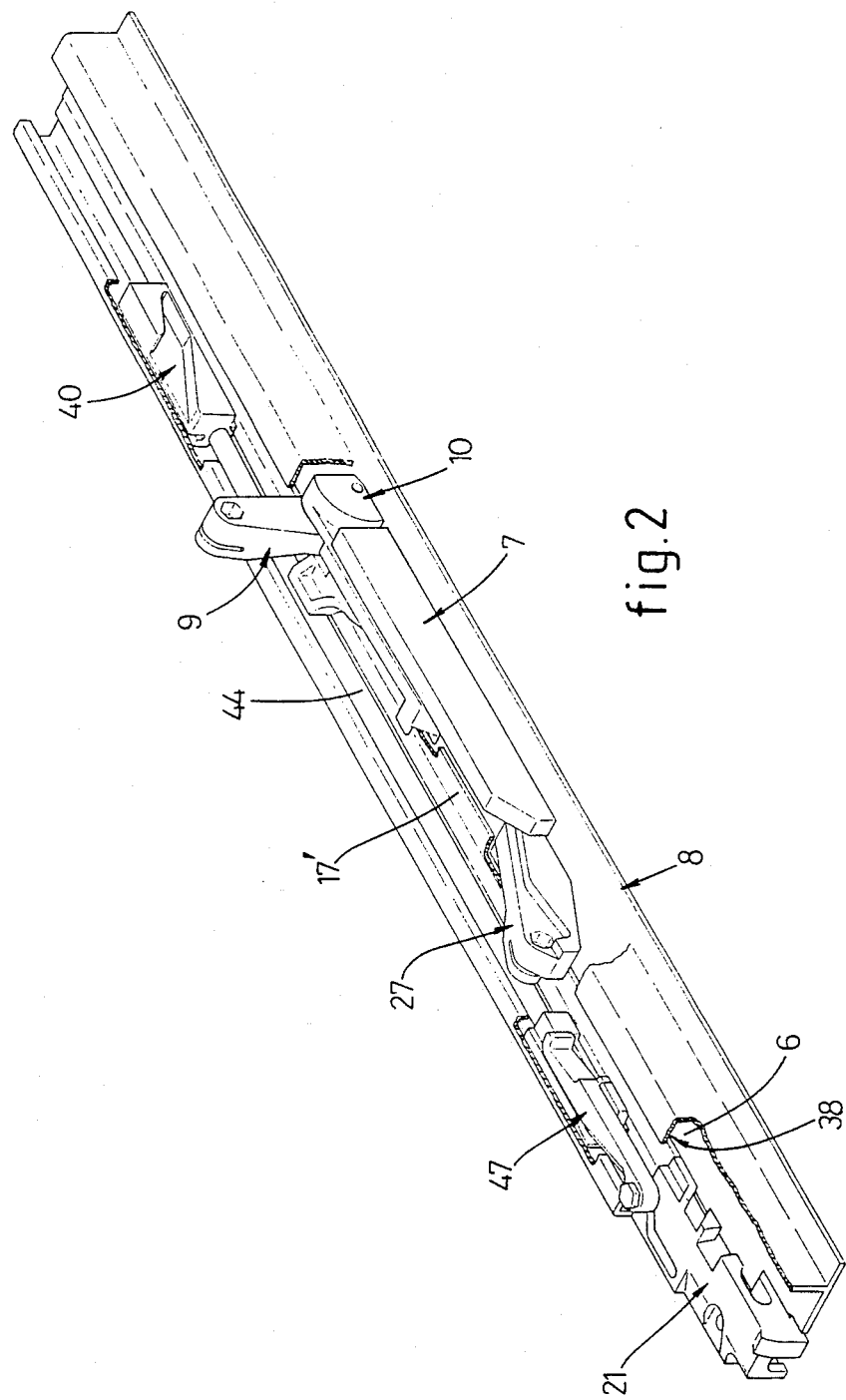

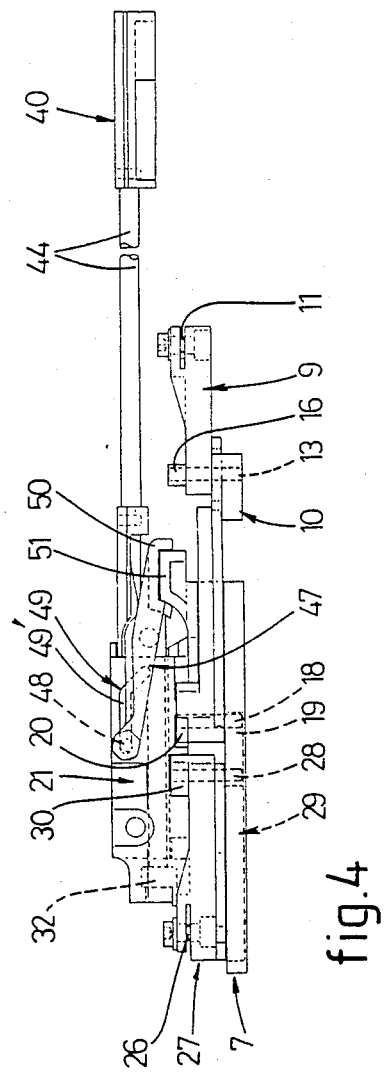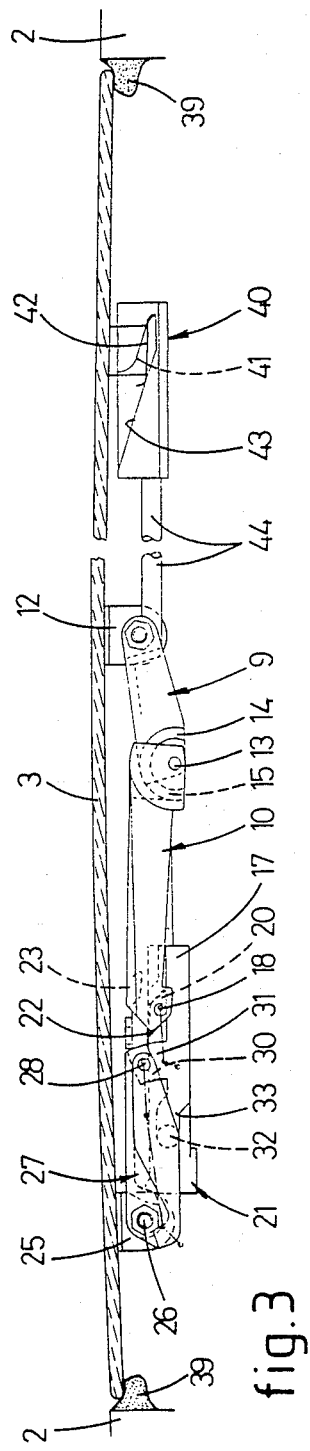
fig.4
fig.3

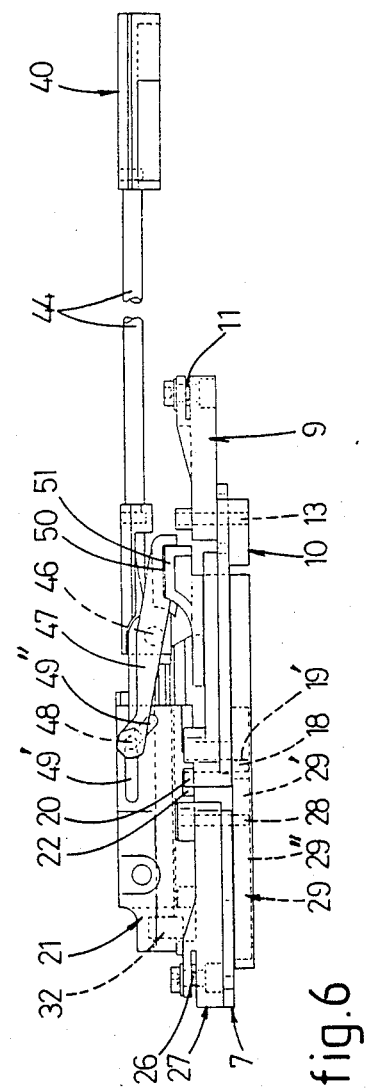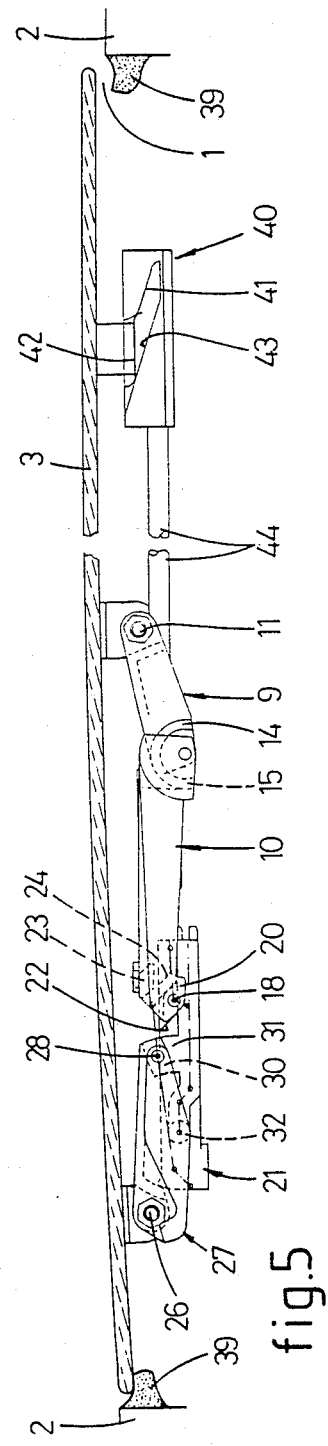

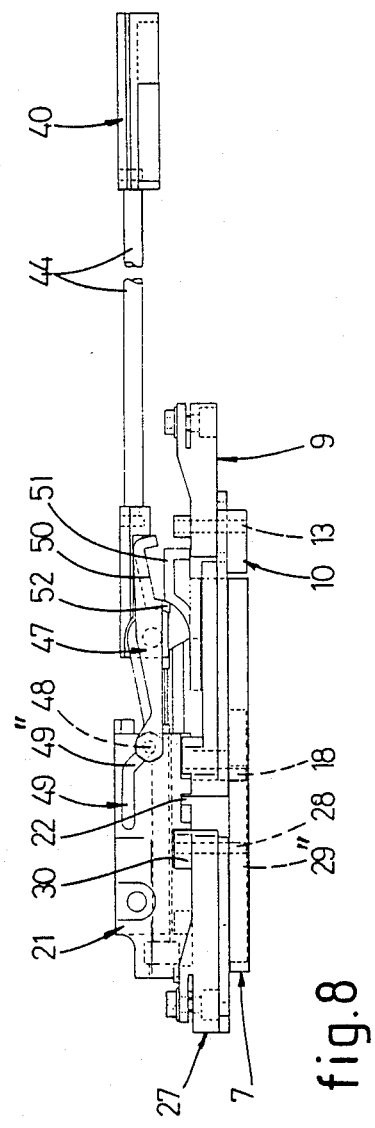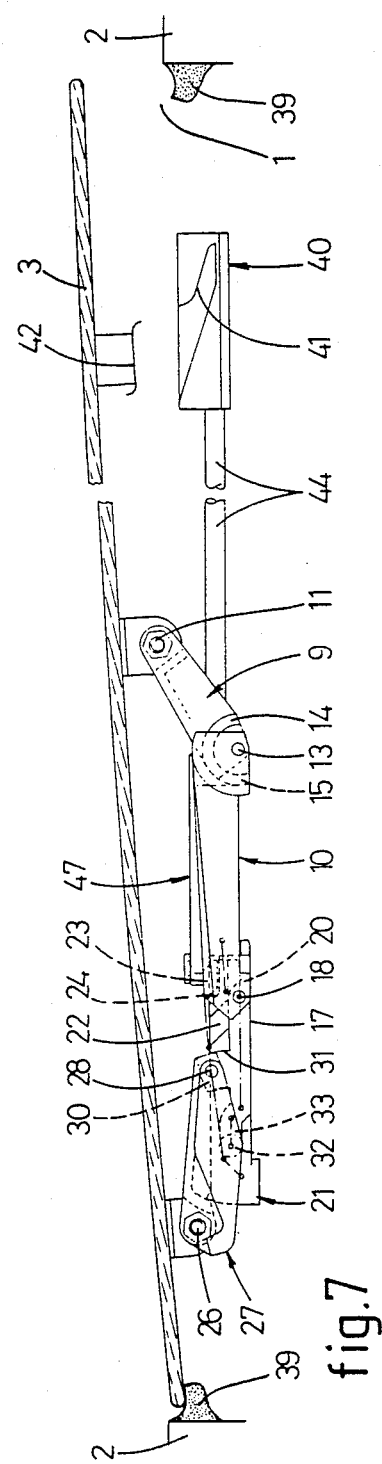

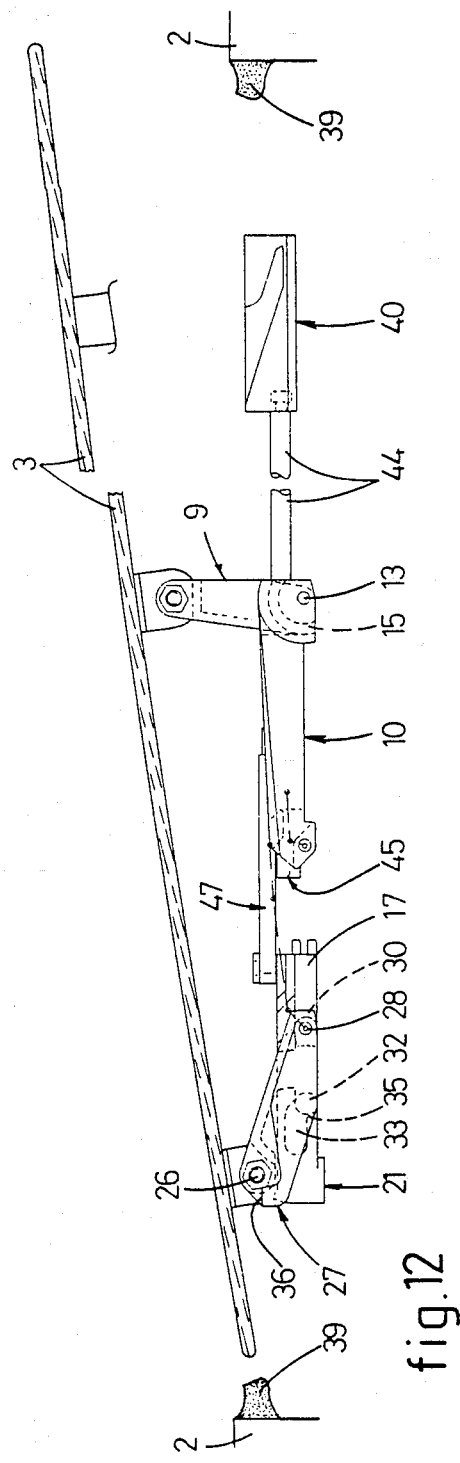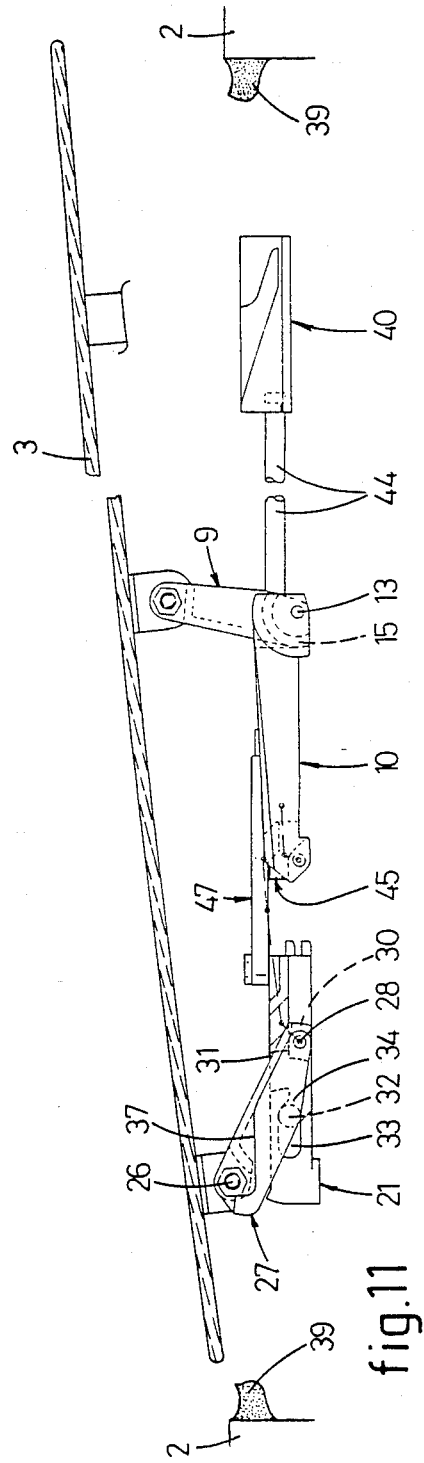

OPEN ROOF CONSTRUCTION FOR A VEHICLE

The invention relates to an open roof construction for a vehicle having an opening in a fixed vehicle roof, comprising an adjustable panel which, in its closed position, closes the opening in the fixed roof and which, by operating an adjusting mechanism, is capable of being pivoted from its closed position to a backwardly and upwardly inclined initial position and thereupon is capable of being moved backwardly into positions above the fixed roof, and vice versa. The panel is pivotally supported at its front side by a transverse pivot shaft. A tilt out lever is provided a selected distance behind said pivot shaft and is pivotally connected to the panel at its upper end. The lower end of the tilt out lever is at least pivotally operatively connected to a slide, which is slidably guided in a stationary guide extending in the longitudinal direction of the vehicle. The slide is adapted to be engaged by a drive means such as a cable-like pull-push means.

High demands are made for such open roof constructions, also referred to as spoiler roofs, in regard of the performance in controlling the movements of the panel. For instance, the front edge of the panel should be kept in engagement with a sealing means on the front edge of the roof opening during the pivotal movement of the panel to prevent air from flowing into the interior of the vehicle along the front edge of the panel. This can be obtained for instance, such as is known in the prior art, by a well chosen position of the pivot shaft at the front side of the panel. Another frequent requirement which cannot be met, by pivot shaft placement and, that is that the front edge of the panel should be below the level of the fixed roof when the panel is in a rearwardly displaced position. An additional requirement is that the panel should be pressed into the sealing means at the circumference of the roof opening by a sufficiently measured force when the panel is in its closed position to prevent leakage and to avoid the need for a water drain.

It is an object of the invention to provide an open roof construction of the type mentioned above, which is able to meet the described requirements and wherein a stable and fully controlled movement of the panel takes place.

For this purpose the open roof construction according to the invention is characterized in that the slide is a control slide, which not only positively controls the movements of the tilt out lever but also controls a height adjusting means carrying the pivot shaft at the front side of the panel.

As a result of having the height adjusting means at the front side of the panel that is positively controlled by the control slide, all required movements can be converted to the panel in co-operation with the tilt out lever.

Further features and advantages of the open roof construction for a vehicle according to the invention will appear from the following description with reference to the drawings, which shows an embodiment of the invention by way of example.

FIG. 2 is a perspective view corresponding to that of FIG. 1, wherein, however, the adjusting mechanism is shown in its assembled condition.

FIG. 3 is a side view of the adjusting mechanism of FIG. 2, wherein the stationary guide is left out for clearity purposes and wherein the panel is in its closed position.

FIG. 4 is a plan view of the adjusting mechanism of FIG. 3.

FIG. 5 is a side view corresponding to that of FIG. 3, wherein, however, the rear side of the panel is just unlocked.

FIG. 6 is a plan view of the adjusting mechanism of FIG. 5.

FIG. 7 is a side view corresponding to that of FIG. 3, wherein, however, the locking element is uncoupled from the control slide.

FIG. 8 is a plan view of the adjusting mechanism of FIG. 7.

FIG. 11 is a side view corresponding to that of FIG. 10, wherein, however, the panel is slid a small distance backwardly.

FIG. 12 is a side view corresponding to that of FIG. 11, wherein, however, the front side of the panel is moved a small distance downwardly below the level of the fixed roof.

Figure 1:
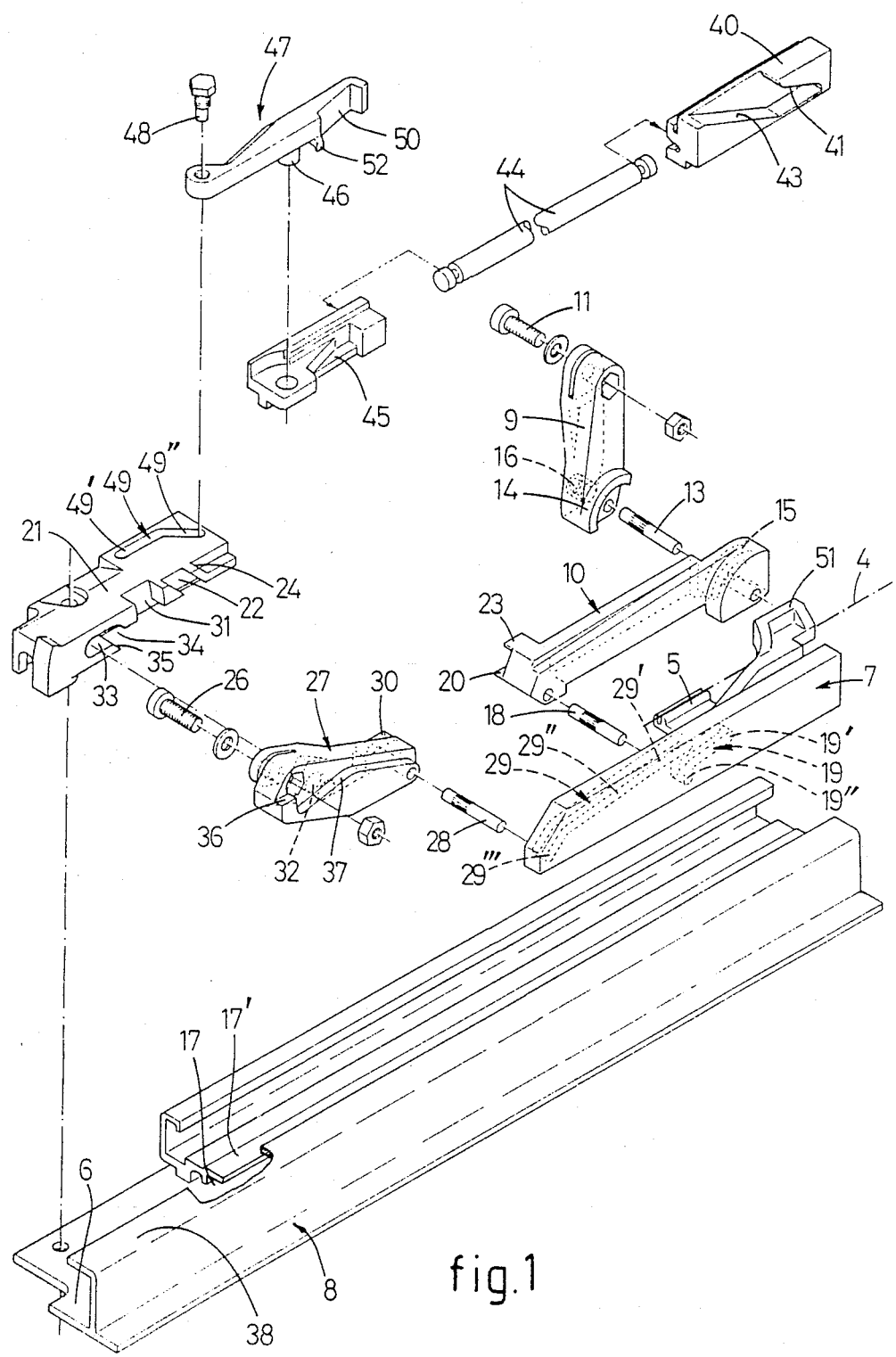
FIG. 1 is an exploded perspective view of a part of the adjusting mechanism of an open roof construction for a vehicle according to the invention.

The drawing shows by way of example an embodiment of an open roof construction for a vehicle having an opening 1 in the fixed roof 2 (FIG. 3).

This open roof construction comprises a panel 3, which, in its closed position, closes the opening 1 in a fixed vehicle roof 2 (FIG. 3), and which, by operating an adjusting mechanism, is capable of being pivoted from its closed initial position into a backwardly and upwardly inclined position (FIG. 9) and thereupon being moved backwardly into various positions above the fixed roof (FIG. 13); and vice versa.

The adjusting mechanism for adjusting the panel 3 is provided at least at one side, but in general at both sides of the open roof construction. An actuating member (not illustrated) is connected to a bracket 5 on a control slide 7 by a pull-push means 4, the control slide 7 is guided in a longitudinal slot 6 of a substantially horizontal stationary guide 8.

Such stationary guide 8 is usually arranged on both sides of the vehicle. Each guide 8 guides a control slide 7 at the respective side of the vehicle, while each control slide 7 is adapted to be moved by its own cable-like pull-push means 4 in its stationary guide 8. Both pull-push means 4 can be simultaneously displaced.

In the embodiment represented in the drawing only the control slide 7 disposed at one side of the vehicle and the corresponding guide 8, as well as elements cooperating therewith, are shown. It is to be understood that in general similar members are used at the other side of the vehicle. Similar members on the opposite side of the vehicle are mirror images of the elements represented in the drawing.

The panel 3 is displaceably supported near the front side in a manner to be described hereinafter.

At a distance behind the front side of the panel 3, the panel 3 and the control slide 7 are connected to each other by a tilt out lever 9 and an intermediate element 10 at a selected distance behind the front edge of panel 3. The element 10 is slidable in the stationary guide 8. The upper end of the lever 9 is pivotally connected to a bracket 12 at the lower side of the panel 3 by means of a transversally extending pivot bolt 11 (see FIG. 5).

The lower end of the tilt out lever 9 is pivotally connected to the intermediate element 10 by means of a transverse pivot pin 13. Furthermore, the tilt out lever 9 is provided, at its side facing the intermediate element 10, with a part-circular guide rib 14 extending concentrically to the pivot pin 13. The guide rib 14 is guided in a correspondingly shaped guide slot 15 arranged in the intermediate element 10.

The pivot pin 13 extends through the tilt out lever 9 and beyond the tilt out lever 9 into a guiding sleeve 16 provided at the side of the tilt out lever 9 facing away from the intermediate element 10. This guiding sleeve 16 is concentric to the pivot pin 13 and engages under a horizontal flange 17' defining a longitudinal slot 17 at the upper side of the stationary guide 8. In this way the horizontal flange 17' guides the guiding sleeve 16 of the tilt out lever.

The engagement between the guiding sleeve 16 and the horizontal flange 17' of the stationary guide 8 on one side of tilt out lever 9, and the guide rib 14 and the guide slot 15 on the other side of tilt out lever 9, a stable guiding of the tilt out lever 9 is effected.

The intermediate element 10 has a transverse guide peg 18 near its front end, which engages a control slot 19 formed in the control slide 7. This control slot 19 includes a rear slot portion 19 inclining slightly downwardly in forward direction, and a slot portion 19" joining thereto and being inclined downwardly in forward direction at a substantially steeper angle.

At the same end of the intermediate element 10 as the guide peg 18, and at the side facing away from the control slide 7, a laterally projecting retaining cam 20 is arranged, which is provided at its front and rear side with parallel surfaces inclining downwardly in rearward direction.

A guide element 21 forming part of the stationary guide 8 has a recess 22 at a side thereof facing the intermediate element 10. Recess 22 is open at the lower side thereof and has surfaces at the front and rear, which are complementary with the front and rear surfaces of the retaining cam 20 on the intermediate element 10. This retaining cam 20 is adapted to come into engagement with the recess 22 of the guide element 21 from below. A protrusion 23 on intermediate element 10 faces the guide element 21 and is arranged near the front end of the intermediate element. The protrusion 23 is made to co-operate with a sloping surface 24 disposed on the guide element 21 behind the recess 22. The sloping surface 24 extends parallel to the front and rear surfaces of the recess 22. The sloping surface 24 cooperates with the protrusion 23 on the intermediate element 10, urge the retaining cam 20 thereof into the recess 22 upon a certain forward displacement of the intermediate element 10. The engagement between the guide peg 18 on the intermediate element 10 and the control slot 19 in the control slide 7 causes the retaining cam 20 to be retained in the recess 22.

The front side of the panel 3 is supported by a tumbler 27 through a bracket 25 mounted to the panel (FIG. 3). The tumbler is pivoted to the bracket about a transverse pivot bolt 26. The tumbler 27 is adapted to tumble or pivot in a vertical, longitudinal plane and to slide in the stationary guide 8, thereby serving as height adjusting means.

Tumbler 27 has a transverse guide pin 28 near its rear end. The guide pin 28 is in engagement with a control slot 29 formed in the control slide 7. This control slot 29 includes a rear slot portion 29' inclining slightly downwardly in forward direction, a central slot portion 29" joining the rear slot portion 29' and inclining downwardly in forward direction under a somewhat steeper angle than the rear slot portion. A front slot portion 29'" joins the central slot portion 29" and inclines downwardly in forward direction under a substantially steeper than the central slot portion. The guide pin 28 on the tumbler 27 is in engagement with the control slot 29 in a slidable manner during the pivoting movement of the panel 3, and the guide pin 28 is locked in the front lower end of the control slot 29 during the sliding movement of the panel 3.

At the side of the tumbler 27 facing away from the control slide 7 a laterally projecting locking cam 30 is provided oppositely to the guide pin 28. This locking cam 30 can be brought upwardly into engagement with a recess 31 formed in the guide element 21 and which is open to the lower side of the guide element 21. During engagement between cam 30 and recess 31 the tumbler 27 is locked against a sliding displacement in the longitudinal direction of the stationary guide 8. The displacement of the locking cam 30 into and out of the respective recess 31 is controlled by the movement of the guide pin 28 of the tumbler 27 in the control slot 29 in the control slide 7. When the locking cam 30 has been moved out of engagement with recess 31, the locking cam 30 is guided by the longitudinal slot 17 formed in the stationary guide 8 under the horizontal flange 17'.

The tumbler 27 further has a guide cam 32 arranged at its side facing the guide element 21 and positioned in the longitudinal centre. This guide cam 32 on the tumbler 27 is in engagement with the front end of a short horizontal guide slot 33 when the panel 3 is in the forward position. In this position, the guide cam 32 serves as a tumbling or pivoting axis for the tumbling movement of the tumbler 27. The guide slot 33 in the guide element 21 has an opening 34 at its rear end. The opening 34 is inclined downwardly in rearward direction and the guide cam 32 on the tumbler 27 being able to leave and enter the guide slot 33 through said opening 34. When the guide cam 32 leaves or enters the guide slot 33 it is displaced in vertical direction, whereby the tumbler tumbles or pivots around the guide pin 28. A ramp 35, which inclines upwardly in forward direction and which defines the lower edge of the opening 34 of the guide slot 33, facilitates entering of the guide cam 32 into the guide slot 33. When the guide cam 32 leaves the guide slot 33 it comes into engagement with the longitudinal slot 17 formed under the horizontal flange 17' of the stationary guide 8.

The tumbler 27 has a first shoulder portion 36 near its front end at the side facing away from the guide element 21, and a second shoulder portion 37 joining to the rear end of the first shoulder portion 36 through a junction portion. The second shoulder portion 37 is in engagement with the lower side of a further horizontal flange 38 of the stationary guide 8 when the tumbler 27 is in its upper position (FIG. 11), and the first shoulder portion 36 is in engagement with this further horizontal flange 38 when the tumbler is in positions in which the guide cam 32 has left the guide slot 33 (FIG. 12, 13).

The adjusting mechanism 4 further comprises a locking device, causing the rear side of the panel 3 to be pressed downwardly into a sealing means 39 at the circumference of the roof opening 1 and to be held there. For this purpose the locking device has a locking element 40 slidably accommodated in the stationary guide 8 and is provided with a downwardly facing locking surface 41 inclining upwardly in forward direction. The panel 3 comprises a flange 42 (see for instance FIG. 3) disposed near the lower side of the panel 3 and extending thereunder, the flange 42 being adapted to be engaged by the locking surface 41 of the forwardly moving locking element 40 near the closed position of the panel 3. When the locking element 40 is displaced further forwardly, the flange 42 is urged downwardly as a consequence of the incline of the locking surface 41. The flange 42 is curved upwardly and downwardly at its front and rear ends respectively. The curved front end of the flange 42 is in contact with the guiding surface 43 extending parallel to the locking surface, when the opposite rear end of the flange 42 is in engagement with the locking surface 41, thereby locking up the flange 42 completely in the locking element 40.

The locking element 40 is moved by locking it to the control slide 7 only during the vicinity of the forwardmost displacement of the control slide 7 and disengaging it from the control slide 7 as the control slide moves rearwardly from a forward position. To accomplish the operation, the locking element 40 is connected to a support means 45 by a connecting rod 44. The support means 45 lies a distance in front of the locking element 40 and is slidably accommodated in the stationary guide 8. This support means 45 carries a coupling lever 47 which is rotatable about a vertical pivot journal 46. This coupling lever 47 has a guide pin 48 at its front end, threadingly coupled to the coupling lever 47, and which guide pin 48 extends downwardly to engage a control slot 49. Control slot 49 is formed in the guide element 21 and opens upwardly. This control slot 49 includes a front slot portion 49' extending parallel to the stationary guide 8 and a rear slot portion 49" joining the rear end of the front slot portion 49' and being inclined outwardly in the direction toward the control slide 7.

The coupling lever 47 is provided with a hook-like part 50 at its end portion opposite from the guide pin 48, with respect to the journal 46. The hook-like part 50 comes into and out of engagement with a counter part 51 formed on the control slide 7 by rotating the coupling lever 47 about the journal 46. At the end of the hook-like part 50 facing the journal 46 of the coupling lever 47 a stop means 52 is formed, which cooperates with the from edge of counter part 51 on the control slide 7. When the coupling lever 47 is in the uncoupled position as shown in FIG. 8, with the guide pin 48 adjacent the rear end of the inclined rear slot portion 49" of the control slot 49, and the control slide 7 is moved forwardly, while the panel 3 moves to the closed position, the front edge of the counter part 51 on the control slide 7 comes into contact with the stop means 52 on the coupling lever 47. The coupling lever 47 is then carried along forwardly upon further movement forwardly of the panel 3 and control slide 7 (see FIG. 8). The guide pin 48 on the coupling lever 47 is thus moved obliquely forwardly in the inclined slot portion 49", thereby causing the coupling lever 47 to rotate clockwise about the journal 46 as shown in FIG. 8. In this way the hook-like part 50 on the coupling lever 47 locks onto the counter part 51 on the control slide 7. When the guide pin 48 has reached the front end of the inclined slot portion 49" of the control slot 49 the coupling operation of the coupling lever 47 and therefore the locking element 40 with the control slide 7 is completely accomplished. The uncoupling operation thereof takes place in a similar way in a reverse sense as the control slide 7 is moved rearwardly.

An advantage of the temporary coupling between the locking element 40 and the control slide 7 is that the locking element 40 only moves a very restricted distance, whereby the panel 3 can be closed securely near the rear side thereof without requiring a large space for permitting the locking element 40 to move rearwardly as far as the control slide 7.

The operation of the adjusting mechanism of the open roof construction according to the invention will hereafter be elucidated with reference to FIG. 3–13. The control slide 7 is left out in the side views of FIG. 3, 5, 7 and 9–13 for clarity purposes.

In FIG. 3 and 4 the adjusting mechanism is illustrated in a position, in which the panel 3 is in its fully closed position. The tilt out lever 9 is pivoted fully downwardly. The flange 42 near the rear side of the panel 3 is locked at the lower edge of the locking surface 41 of the locking element 40. The retaining cam 20 of the intermediate element 10 is fully seated in the recess 22 in the guide element 21. The guide pin 18 of the intermediate element 10 is in engagement with the rear end of the control slot 19 and the control slide 7 (FIG. 4). The locking cam 30 on the tumbler 27 is in its upper position in the recess 31 of the guide element 22, while the guide cam 32 of the tumbler 27 abuts the front wall of the guide slot 33 in the guide element 21.

The guide pin 28 on the tumbler 27 is in its rear position in the control slot 29 in the control slide 7 (FIG. 4). The coupling lever 47 is in its coupled position, in which the hook-like part 50 thereof engages around the counter part 51 on the control slide 7, and the guide pin 48 abuts the front wall of the front slot portion 49' of the control slot 49 (FIG. 4).

FIG. 5 and 6 show the position of the adjusting mechanism, in which the rear side of the panel 3 is moved a small distance upwardly such that the rear edge and the side edges of the panel are free of the sealing means 39 at the circumference of the roof opening 1, while only the front edge of the panel 3 is still in engagement with the sealing means 39 (FIG. 5). For this purpose, as can best be seen in FIG. 6, the control slide 7 has been displaced rearwardly such a distance by the pull-push means, that the guide pin 48 on the coupling lever 47 coupled to the control slide 7 has reached the transition between the first slot portion 49' and the second slot portion 49" of the control slot 49 in the guide element 21. As a result thereof the locking element 40 is displaced the same distance rearwardly, whereby the locking element 40 has moved so the guide surface 43 clears flange 42 near the rear side of the panel 3 and the flange 42 has been pushed upwardly as a result of the incline of the guide surface.

In the position shown in FIG. 5 the guide peg 18 on the intermediate element 10 has passed through the slot portion 19' of the control slot 19 in the control slide 7 and has reached the transition between the slot portions 19' and 19" thereof. As a consequence of the very gentle inclination of the slot portion 19' the retaining cam 20 on the intermediate element 10 has been displaced obliquely downwardly in rearward direction a very small distance in the recess 22 in the guide element 21.

The tumbler 27 has been tumbled or pivoted about the guide cam 32 a very small angle as a consequence of the relative displacement of the guide pin 28 in the slightly declining rear slot portion 29' of the control slot 29 in the control slide 7 (FIG. 6).

FIG. 7 and 8 show the position of the adjusting mechanism, in which the panel 3 has been pivoted further upwardly such that the lock comprising flange 42 at the rear side of the panel 3 has been released and the locking element 40 has been uncoupled from the control slide 7.

Upon further rearward displacement of the control slide 7, from the position shown in FIGS. 5 and 6, the intermediate element 10 has been carried along with the control slide 7 by the guide pin 18, which has come into engagement with the slot portion 19'' of the control slot 19 in the control slide 7. Slot portion 19'' substantially vertical downwardly. The downward displacement of the guide pin 18 in this slot portion 19'' is imposed by the engagement between the retaining cam 20 on the opposite side of intermediate element 21 and the recess 22 in the guide element 21, which recess 22 inclines downwardly in rearward direction. It can be seen in FIG. 7, that, in the mean time, the retaining cam 20 has left the recess 22 and is retained in the longitudinal slot 17 of the stationary guide 8. Because the retaining cam 20 has been locked against an upward displacement in the longitudinal slot 17, the guide pin 18 on the intermediate element 10 will be retained in the lower position in the slot portion 19'' of the control slot 19 in the control slide 7, so that the intermediate element 10 and the control slide 7 are connected to each other in a non-slidably manner and will move as one part upon a further rearward displacement of the control slide 7. As a result thereof the tilt out lever 9 is caused to pivot with respect to the control slide 7 in these positions.

When the pivot pin 13 of the tilt out lever 9 is moved rearwardly by movement of control slide 7, while the front pivot bolt 26 of the panel 3 is held in its position in horizontal sense, the tilt out lever 9 pivots upwardly, thereby moving the panel upwardly at the pivot bolt 11, as is shown by a comparism of FIG. 5 and 7.

FIG. 7 further illustrates that the flange 42 near the rear side of the panel 3 has come out of engagement with the locking surface 41 of the locking element 40 as a result of the pivoting movement of the panel 3 by means of the tilt out lever 9 after the small rearward displacement of the locking element 40 while it was coupled to the control slide 7.

In FIG. 8 it can be seen that the guide pin 48 on the coupling lever 47 has passed through the inclined slot portion 49'' in the guide element 21, so the coupling lever 47 has been rotated about the vertical journal 46 and the hook-like part 50 on the coupling lever 47 has released from the counterpart 51 on the control slide 7. In this way the locking element 40 has been uncoupled from the control slide 7, so that, upon a further rearward displacement of the control slide 7, the locking element 40 and the parts connected thereto remain stationary. A spring means (not shown) causes the locking element to remain in this position.

Upon the rearward displacement of the control slide 7 between the positions of FIG. 5 and 7, the guide pin 28 on the tumbler 27 has passed through the gently declining slot portion 29'' of the control slot 29 in the control slide 7, as a consequence whereof the opposite locking cam 30 moves a very small distance downwardly in the recess 31 in the guide element 21. As a result of locking cam 30 moving downwardly the tumbler 27 tumbles or pivots about the guide cam 32, and the pivot bolt 26 near the front end of the tumbler 27 just moves sufficiently upwardly to compensate the downward displacement of the front edge of the panel 3 caused by the pivoting movement of the panel 3 about pivot bolt 26. In this way a proper engagement between the front edge of the panel 3 and the sealing means 39 at the front edge of the roof opening 1 is maintained.

Figure 9:
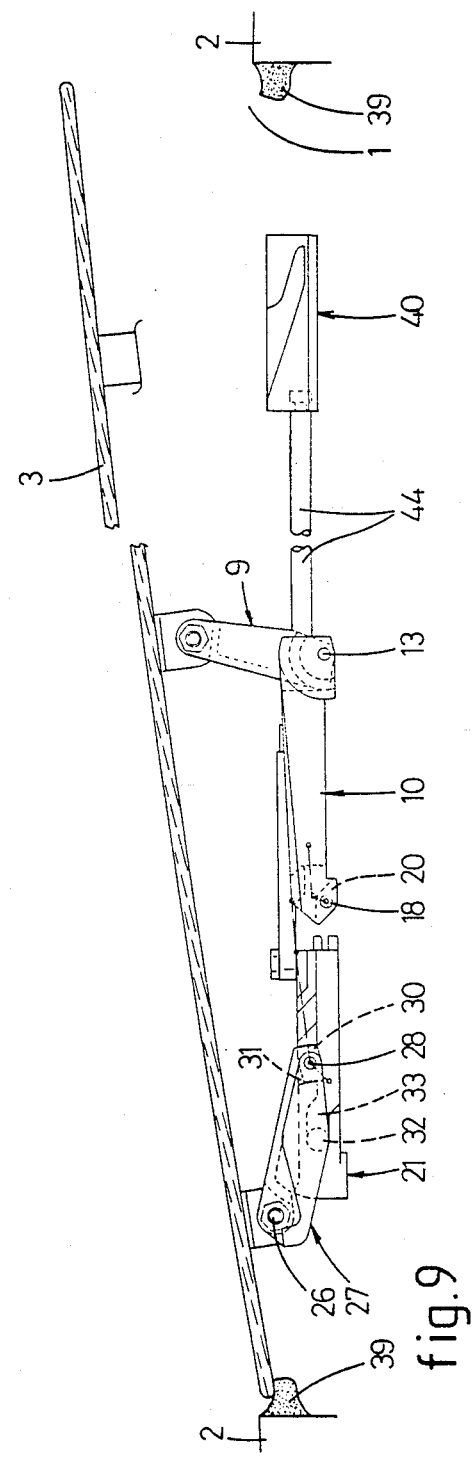
FIG. 9 is a side view corresponding to that of FIG. 3, wherein, however, the panel is in the maximum upwardly pivoted position.

FIG. 9 shows the position of the adjusting mechanism, in which the panel 3 has reached the maximum upwardly pivoted position. For this purpose the control slide 7 has been moved further backwardly with respect to the position of FIG. 7 and 8, whereby the tilt out lever 9 is pivoted upwardly. The guide pin 28 on the tumbler 27 reaches the transition between the central slot portion 29'' and the front slot portion 29''' of the control slot 29 in the control slide 7 to cause the tumbler 27 to pivot slightly more about the guide cam 32.

Figure 10:
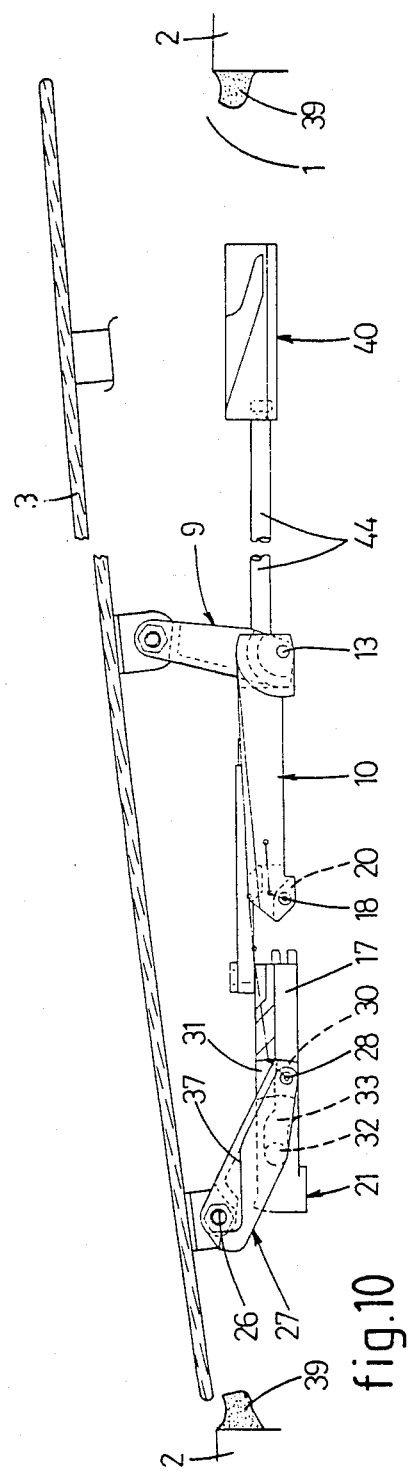
FIG. 10 is a side view corresponding to that of FIG. 9, wherein, however, the front side of the panel is raised off of the sealing means of the roof.

In FIG. 10 there is illustrated the position of the adjusting mechanism, in which the front edge of the panel 3 has been moved slightly rearwardly and upwardly such that the front edge of the panel 3 has been released from the sealing means 39 at the front edge of the roof opening 1. This is accomplished by the tumbling movement of the tumbler 27 about the guide cam 32, whereby the pivot bolt 26 connected to the panel 3 has been moved upwardly. The tumbling movement of the tumbler 27 is a result of the downward displacement of the guide pin 28 in the inclined front slot portion 29''' of the control slot 29 in the control slide 7 upon the rearward sliding displacement of the control slide. In FIG. 10 the guide pin 28 has reached the position at the lower end of the slot portion 29''' (not shown). The locking cam 30 has been moved downwardly to such an extent as a result thereof that it has left the recess 31 in the guide element 21 and is seated in the longitudinal slot 17 of the stationary guide 8. As a consequence thereof the locking of the tumbler 27 against a rearward sliding thereof has been released. The tumbler 27 is then permitted to be moved rearwardly as the control slide 7 moves further rearwardly. Because the locking cam 30 of the tumbler 27 is the longitudinal slot 17 of the stationary guide 8, the guide pin 28 on the tumbler 27 which is aligned with the locking cam 30 is also locked in its lower position in the inclined slot portion 29''' of the control slot 29 in the control slide 7. A connection is thus formed which prevents sliding movement between the control slide 7 and the tumbler 27 in the longitudinal direction of the stationary guide 8. Upon a further rearward displacement of the control slide 7 the tumbler 27 moves along with the control slide 7 as an integrated part.

FIG. 11 illustrates the position of the adjusting mechanism, in which the panel 3 has been moved a small distance rearwardly such that the front edge of the panel 3 is lying behind the sealing means 39 at the front edge of the roof opening 1, as seen in horizontal direction. The tumbler 27 has been displaced rearwardly together with the control slide 7 and the guide cam 32 has reached the rear end of the horizontal guide slot 33 in the guide element and is lying in front of the inclined downwardly directed opening 34.

FIG. 12 shows the position of the adjusting mechanism, in which the front edge of the panel 3 is lying below the level of the fixed roof 2 at the front edge of the roof opening 1. This is effected by the tumbling or pivoting movement of the tumbler 27 about the guide pin 28 such that the pivot bolt 26 on the tumbler 27 connected to the panel 3 has been moved downwardly. The tumbling movement of the tumbler 27 about guide pin 28 has been caused by the guide cam 32 has left moving downwardly along the ramp 35 to leave guide slot 32 and reaching the lower longitudinal slot 17, in which the guide cam 32 is accommodated in a slidable manner.

Figure 13:
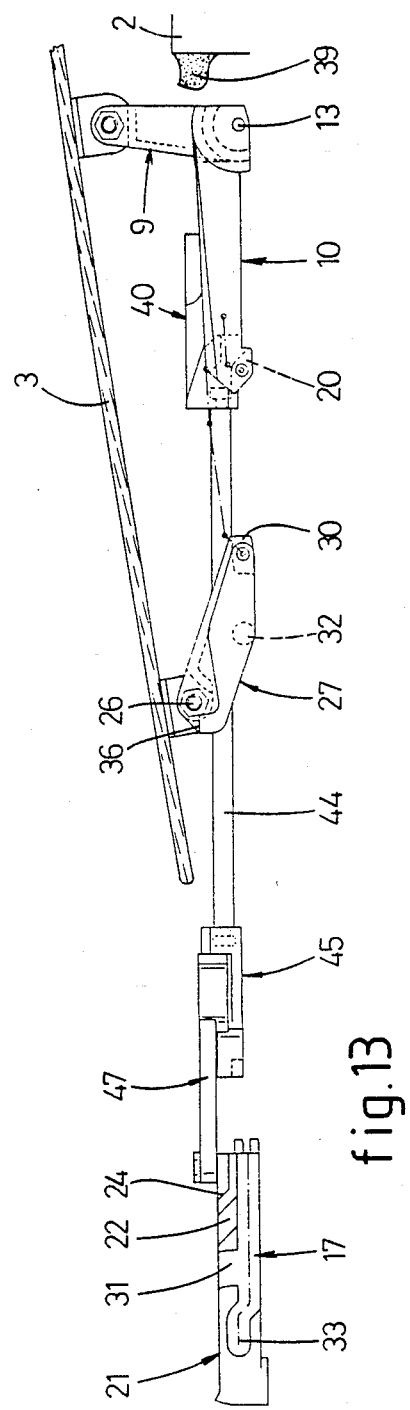
FIG. 13 is a side view corresponding to that of FIG. 12, wherein, however, the panel is slid fully backwardly.

In FIG. 13 there is shown the position of the adjusting mechanism, in which the panel 3 is in its fully rearwardly slid position. This is caused by the rearward displacement of the control slide 7, the intermediate element 10, the tilt out lever 9 and the tumbler 27 as an integral assembly. Both the tumbler 27 and the tilt out lever 9 are guided at both sides by different means, so that the stable support for the panel 3 is provided in all positions.

The movements of the adjusting mechanism and the panel in the direction to the closed position of the panel take place in a similar way but in opposite sense.

The invention provides an open roof construction for a vehicle, which effects a fully positive control of both the front and rear side of the panel. As a result thereof it is possible that the front edge of the panel abuts the sealing means at the front edge of the roof opening in every forward pivot position of the panel, while it is also possible to move the front edge of the panel below the level of the fixed roof in the rearwardly slid positions of the panel. Furthermore there is provided a very stable support of the panel free of rattling, without utilizing troublesome springs. Additionally the structure has a minimum built-in height.

The invention is not restricted to the embodiment shown in the drawing by way of example, which can be varied in different ways within the scope of the invention.

I claim:

1. An open roof construction for a vehicle having an opening in its fixed roof, comprising
    a stationary guide means provided on a side of the roof opening and extending in the longitudinal direction of the vehicle;
    an adjustable panel having front and rear sides and closing the opening in the fixed roof in a closed position, and, by operating an adjusting mechanism, being capable of being firstly pivoted from its closed position to a position inclining upwardly in a rearward direction and thereupon being slidably movable rearwardly into positions above the fixed roof;
    a tilt out lever having lower and upper ends and being spaced from the front side of the panel, the tilt out lever being pivotally connected to the panel at said upper end;
    a slide being slidably guided in the stationary guide means and being adapted to be driven by a drive means, the slide and the tilt out lever being pivotally operatively connected; and a height adjusting means carrying a pivot shaft connected to the front side of the panel and comprising a tumbler coupled to the slide and adapted to tumble in a vertical longitudinal plane;
    wherein said slide is a control slide not only positively controlling movement of the tilt out lever but also of the height adjusting means.

2. An open roof construction according to claim 1, wherein the tumbler and the control slide are in continuous engagement with each other, the control slide and the tumbler being in sliding engagement during the pivoting movement of the panel, and means for moving the control slide and the tumbler in locking engagement during substantially the entire sliding movement of the panel.

3. An open roof construction according to claim 2, wherein the engagement between the tumbler and the control slide is effected by means of a guide pin fixed to the tumbler, and a control slot formed in the control slide, the guide pin engaging and being guided in the control slot.

4. An open roof construction according to claim 3, wherein the tumbler comprises a laterally projecting locking cam which engages into a recess formed in the stationary guide means when the panel is in its forward position and which moves out of engagement with said recess by tumbling the tumbler upon displacement of the control slide rearwardly, the tumbler thereafter moving rearwardly in locking engagement with the control slide upon further rearward movement of the control slide.

5. An open roof construction according to claim 4, wherein the control slot, in which the guide pin of the tumbler is guided, inclines at least partially downwardly in a forward direction to a forward lower end, the locking engagement between the control slide and the tumbler being effected by engagement between the locking cam on the tumbler and an overhead flange of the stationary guide means on the one hand and by engagement of the guide pin of the tumbler with the forward lower end of the control slot in the control slide, which slot extends at an acute angle to the stationary guide means, on the other hand.

6. An open roof construction according to claim 5, wherein the control slot in the control slide includes a plurality of joining slot portions inclining downwardly in forward direction, a front slot portion thereof being inclined at a substantially steeper angle than other slot portions.

7. An open roof construction according to claim 5, wherein the tumbler comprises a guide cam and the stationary guide means is provided with a short horizontal guide slot having means defining a downwardly inclined passage opening at its rear side, the guide cam on the tumbler being in engagement with the front end of the guide slot in the stationary guide means when the panel is in the forward position, and the guide cam on the tumbler, upon the rearward displacement thereof, leaving the guide slot in the stationary guide means in a downwardly inclined direction, such that the pivot shaft between the tumbler and the front side of the panel is moved downwardly.

8. An open roof construction according to claim 1, wherein there is provided a locking element for positively pushing the rear side of the panel downwardly into sealing means around the roof opening in the closed position of the panel, the locking element comprising a locking surface inclining upwardly in forward direction and being adapted to come into engagement with a flange means fixed to the panel when the panel is near its closed position, the locking element including means adapted to be coupled to the control slide in order to move the locking element in the longitudinal direction of the stationary guide means.

9. An open roof construction according to claim 8, wherein the means adapted to be coupled to the control slide includes a coupling lever rotatably connected in a central portion to the locking element by means of a substantially vertical journal, the stationary guide means having a second control slot defined therein, the coupling lever having a substantially vertical guide peg in engagement with the second control slot, the second control slot having a portion inclining at least partially in transverse direction, the coupling lever having a hook-like part adapted to engage around a counter part on the control slide to releasably couple the locking element to the control slide as the guide peg moves along the transversely inclining portion of the second control slot.

10. An open roof construction according to claim 9, wherein the coupling lever is provided with a stop means facing the control slide, the counter part formed on the control slide abutting against the stop means during forward movement of the control slide, whereby the coupling lever and the locking element are carried forwardly together with the control slide, while the coupling lever is pivoted about the vertical journal as a result of the transverse inclining portion of the second control slot in the stationary guide, and the hook-like part engaging around the counter part on the control slide as the control slide moves farther forwardly after the counter part abuts on the stop member.

11. An open roof construction according to claim 9 wherein the coupling lever is pivotally mounted onto a support means slidable in the stationary guide means and being connected to the locking element positioned rearwardly of the support means.

12. An open roof construction according to claim 8, wherein the tilt out lever is connected to the control slide through an intermediate element slidably guided in the stationary guide means, the intermediate element being pivotally engaged by the tilt out lever through a pivot pin on one hand and being partially slidably in engagement with the control slide on the other hand, the intermediate element being retained with respect to the stationary guide means while the control slide moves with respect to the intermediate element during locking and unlocking movement of the locking element.

13. An open roof construction according to claim 12, wherein the intermediate element has a laterally extending retaining cam on one side, and the stationary guide means being provided with a recess inclining downwardly in rearward direction and being open at the lower side, the retaining cam being able to engage into said recess to lock the intermediate element.

14. An open roof construction according to claim 13, wherein the intermediate element comprises a transverse guide pin at its forward end, the guide pin lying at an opposite side to the retaining cam and being in engagement with a third control slot formed in the control slide and having a rear slot portion inclining slightly downwardly in forward direction and a front slot portion extending substantially vertically downwardly.

15. An open roof construction according to claim 1, wherein the tilt out lever is provided at its side facing the intermediate element with a partly circular guide rib extending concentrically to the pivot shaft of the tilt out lever and being guided in a correspondingly shaped guiding slot formed in the intermediate element, the tilt out lever having at its side facing away from the intermediate element a guide sleeve extending concentrically to the pivot shaft.

16. An open roof construction for a vehicle having an opening in its fixed roof, comprising
a stationary guide means provided on a side of the roof opening and extending in the longitudinal direction of the vehicle;
an adjustable panel having front and rear sides and closing the opening in the fixed roof in its closed position, and, by operating an adjusting mechanism, being capable of being firstly pivoted from its closed position to a position inclining upwardly in rearward direction and thereupon being moved rearwardly into positions above the fixed roof;
a tilt out lever having lower and upper ends and being spaced from the front side of the panel, the tilt out lever being pivotally connected to the panel at said upper end;
a slide being slidably guided in the stationary guide means and being adapted to be driven by a drive means, the slide and the tilt out lever being pivotally operatively connected; and
a locking element for positively pushing the rear side of the panel downwardly into sealing means around the roof opening in the closed position of the panel, the locking element being slidably guided in the stationary guide means and comprising a locking surface inclining upwardly in forward direction and being adapted to come into engagement with a flange means fixed to the panel near the rear side of the panel, when the panel is near its closed position, and engageable and disengageable coupling means for coupling and uncoupling the locking element to the slide in order to cause the locking element to be moved in the longitudinal direction of the stationary guide means as it respectively locks and unlocks the panel.

17. An open roof construction for a vehicle having an opening in its fixed roof, comprising stationary guide means provided on a side of the roof opening and extending in the longitudinal direction of the vehicle; an adjustable panel having front and rear sides and closing the opening in the fixed roof in its closed position, and, by operating an adjusting mechanism, being operated to first pivot from its closed position to a position inclining upwardly in rearward direction and thereupon to slide rearwardly into positions above the fixed roof; a tilt out lever having lower and upper ends and being spaced from the front side of the panel, the tilt out lever being pivotally connected to the panel at said upper end; a control slide being slidably guided in the stationary guide means and being adapted to be driven by drive means, the slide and the tilt out lever being operatively pivotally connected, said control slide controlling movement of the tilt out lever; and height adjusting means being connected to the control slide through control means and being guided in the stationary guide means, and having pivot means supporting the front side of the panel, the height adjusting means and control means adjusting the pivot means upwardly during the pivoting movement of the panel, and adjusting the pivot means downwardly during at least a part of the sliding movement of the panel as the control slide moves relative to the stationary guide means to cause the pivoting and sliding movement of the panel.

* * * * *